United States Patent [19]

Groves et al.

[11] Patent Number: 4,943,083
[45] Date of Patent: Jul. 24, 1990

[54] SIGNAL CONDITIONING CIRCUIT ASSEMBLY

[75] Inventors: Gary W. Groves, Monroe, Mich.; David L. Perry, Sylvania, Ohio

[73] Assignee: Monroe Auto Equipment Company, Monroe, Mich.

[21] Appl. No.: 322,543

[22] Filed: Mar. 13, 1989

[51] Int. Cl.[5] .......................................... B60G 17/08
[52] U.S. Cl. ..................................... 280/707; 188/299
[58] Field of Search ................ 280/707, 714; 188/319, 188/285, 299

[56] References Cited

U.S. PATENT DOCUMENTS

| 264,525 | 9/1882 | Glenn | 251/283 |
|---|---|---|---|
| 294,216 | 2/1884 | Fletcher | 251/283 |
| 329,650 | 11/1885 | Jackson | 251/283 |
| 505,850 | 10/1893 | Rothchild | 251/58 |
| 616,796 | 12/1898 | Mitchell | 251/310 |
| 631,435 | 8/1899 | Pickles | 173/169 |
| 1,403,003 | 1/1922 | Beatson | 123/586 |
| 1,517,877 | 12/1924 | Wallem | 137/613 |
| 1,544,608 | 7/1925 | Smith et al. | 137/447 |
| 1,819,343 | 9/1928 | Shipley | 137/625.32 |
| 2,061,068 | 11/1936 | Fuchs | 188/299 |
| 3,039,566 | 6/1962 | Rumsey | 188/299 |
| 3,110,322 | 11/1963 | Bozoyan | 137/625.23 |
| 3,124,368 | 3/1964 | Corley et al. | 280/707 |
| 3,471,824 | 10/1969 | Greulich et al. | 339/61 |
| 3,495,625 | 2/1970 | Shuttleworth et al. | 137/637.4 |
| 3,506,239 | 4/1970 | Johnson | 251/310 |
| 3,995,883 | 12/1976 | Glaze | 280/707 |
| 4,031,989 | 6/1977 | Blazquez | 188/299 |
| 4,065,154 | 12/1977 | Glaze | 280/707 |
| 4,113,072 | 9/1978 | Palmer | 188/282 |
| 4,125,238 | 11/1978 | Tanaka | 248/56 |
| 4,313,529 | 2/1982 | Kato et al. | 188/289 |
| 4,325,468 | 4/1982 | Siorek | 188/282 |
| 4,333,668 | 6/1982 | Hendrickson et al. | 280/703 |
| 4,468,050 | 8/1984 | Woods et al. | 280/707 |
| 4,469,315 | 9/1984 | Nichols et al. | 367/64.17 |
| 4,526,401 | 7/1985 | Kakizaki et al. | 280/707 |
| 4,534,580 | 8/1985 | Kobayashi et al. | 280/712 |

(List continued on next page.)

FOREIGN PATENT DOCUMENTS

| 0115202 | 8/1984 | European Pat. Off. . |
|---|---|---|
| 0166313 | 1/1986 | European Pat. Off. . |
| 0186908 | 7/1986 | European Pat. Off. . |
| 0200446 | 11/1986 | European Pat. Off. . |
| 1505417 | 3/1970 | Fed. Rep. of Germany . |
| 2911768 | 10/1980 | Fed. Rep. of Germany . |
| 3334704 | 4/1985 | Fed. Rep. of Germany . |
| 3405315 | 8/1985 | Fed. Rep. of Germany . |
| 3425988 | 1/1986 | Fed. Rep. of Germany . |
| 3428306 | 2/1986 | Fed. Rep. of Germany . |
| 7028174 | 6/1987 | Fed. Rep. of Germany . |
| 3348176 | 2/1988 | Fed. Rep. of Germany . |
| 1095506 | 6/1955 | France . |
| 1130621 | 2/1957 | France . |

(List continued on next page.)

OTHER PUBLICATIONS

Burns, Jerry W., "A Dry Air Electronic-Controlled Leveling System for Passenger Cars and Light Trucks", SAE Paper No. 780051.

Packer, "Active Ride Control—A Logical Step from Static Vehicle Attitude Control", SAE Paper No. 780050.

Yokoya, Y., et al., "Toyota Electronic Modulated Suspension (TEMS) System for the 1983 Soarer", SAE Paper No. 840341.

Primary Examiner—Richard A. Bertsch
Attorney, Agent, or Firm—Harness, Dickey & Pierce

[57] ABSTRACT

A signal conditioning circuit assembly for use with a shock absorber. The signal conditioning circuit includes a pressure sensor for sensing differential pressure between the damping fluid stored in the upper and lower portions of the working chamber. The signal conditioning circuit assembly further includes a signal conditioning circuit which is used for conditioning the output of the pressure sensor. In another embodiment, the signal conditioning circuit assembly further includes an accelerometer for sensing the velocity of the body of the vehicle, as well as a signal conditioning circuit which conditions the output from the accelerometer.

28 Claims, 10 Drawing Sheets

U.S. PATENT DOCUMENTS

| | | | |
|---|---|---|---|
| 4,576,258 | 3/1986 | Spisak et al. | 188/299 |
| 4,597,411 | 7/1986 | Lizell | 137/493.8 |
| 4,598,929 | 7/1986 | Kumagai et al. | 280/707 |
| 4,600,215 | 7/1986 | Kuroki et al. | 280/707 |
| 4,620,619 | 11/1986 | Emura et al. | 188/319 |
| 4,635,960 | 1/1987 | Shirakuma | 280/707 |
| 4,638,896 | 1/1987 | Poyser | 188/299 |
| 4,645,044 | 2/1987 | Kato et al. | 188/319 |
| 4,648,622 | 3/1987 | Wada et al. | 280/707 |
| 4,660,686 | 4/1987 | Munning et al. | 188/280 |
| 4,671,392 | 6/1987 | Wossner | 188/299 |
| 4,673,067 | 6/1987 | Munning et al. | 188/299 |
| 4,682,675 | 7/1987 | Eddy, Jr. | 188/299 |
| 4,696,379 | 9/1987 | Yamamoto et al. | 188/299 |
| 4,722,548 | 2/1988 | Hamilton et al. | 280/707 |
| 4,723,640 | 2/1987 | Beck | 188/319 |
| 4,726,453 | 2/1988 | Obstfelder et al. | 188/319 |
| 4,729,459 | 3/1988 | Inagaki et al. | 188/299 |
| 4,732,408 | 3/1988 | Ohlin | 280/707 |
| 4,749,069 | 6/1988 | Knecht et al. | 188/299 |
| 4,749,070 | 6/1988 | Moser et al. | 188/299 |

FOREIGN PATENT DOCUMENTS

| | | |
|---|---|---|
| 1242350 | 8/1960 | France . |
| 1508169 | 11/1967 | France . |
| 2552515 | 3/1985 | France . |
| 55-11924 | 1/1980 | Japan . |
| 55-142141 | 11/1980 | Japan . |
| 57-173629 | 10/1982 | Japan . |
| 57-173630 | 10/1982 | Japan . |
| 57-173632 | 10/1982 | Japan . |
| 57-182506 | 11/1982 | Japan . |
| 58-50339 | 3/1983 | Japan . |
| 58-131442 | 8/1983 | Japan . |
| 58-141909 | 8/1983 | Japan . |
| 58-146742 | 9/1983 | Japan . |
| 59-97339 | 6/1984 | Japan . |
| 59-128941 | 8/1984 | Japan . |
| 59-137641 | 8/1984 | Japan . |
| 59-197639 | 11/1984 | Japan . |
| 60-9707 | 1/1985 | Japan . |
| 60-12325 | 1/1985 | Japan . |
| 61-13041 | 1/1986 | Japan . |
| 8500120 | 3/1985 | PCT Int'l Appl. . |
| 8600212 | 5/1986 | PCT Int'l Appl. . |
| 71063820 | 10/1975 | Switzerland . |
| 664770 | 1/1952 | United Kingdom . |
| 1450441 | 9/1976 | United Kingdom . |
| 1450765 | 9/1976 | United Kingdom . |
| 1485003 | 9/1976 | United Kingdom . |
| 2112104 | 7/1983 | United Kingdom . |
| 2117875 | 10/1983 | United Kingdom . |
| 2120355 | 11/1983 | United Kingdom . |
| 2134625 | 8/1984 | United Kingdom . |
| 2147683 | 5/1985 | United Kingdom . |
| 2159917 | 12/1985 | United Kingdom . |
| 2177475 | 1/1987 | United Kingdom . |

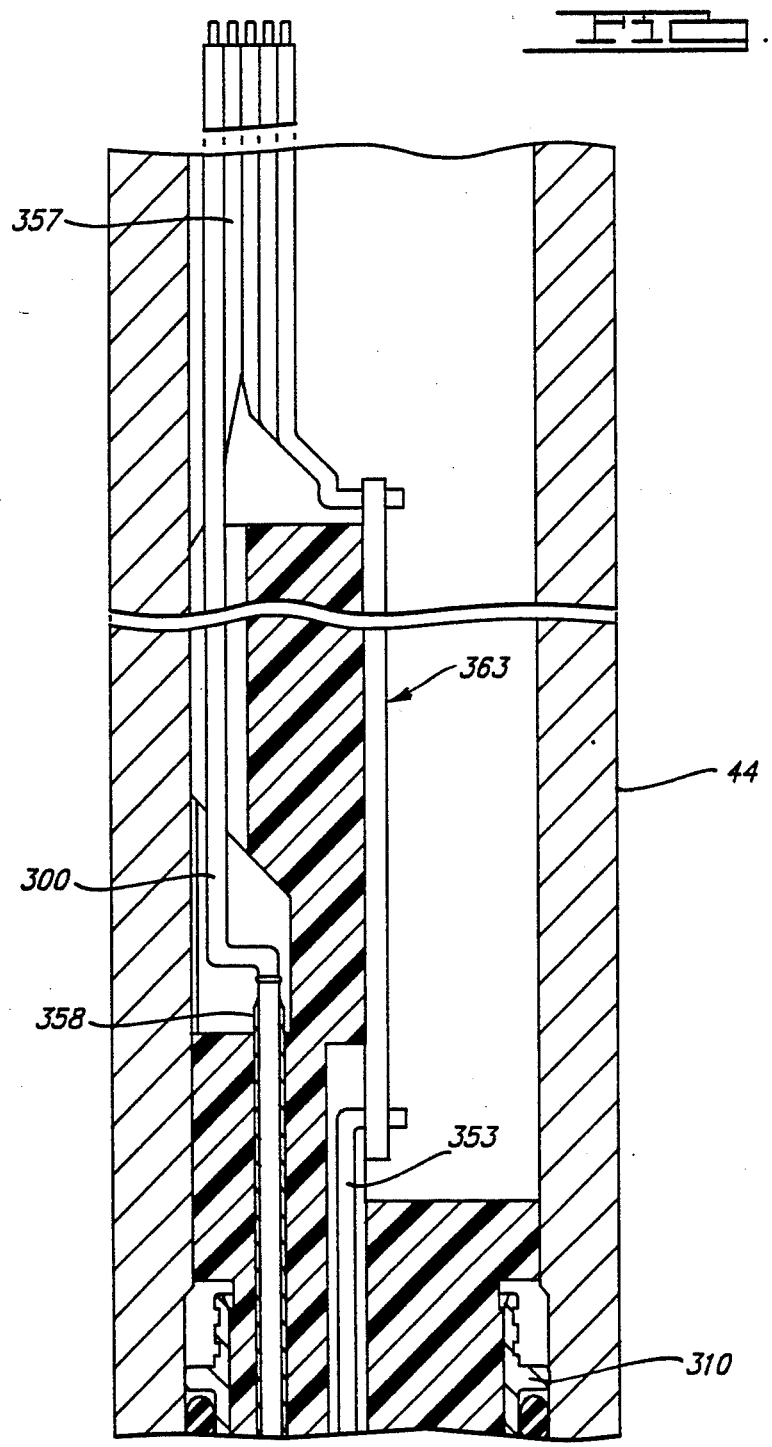

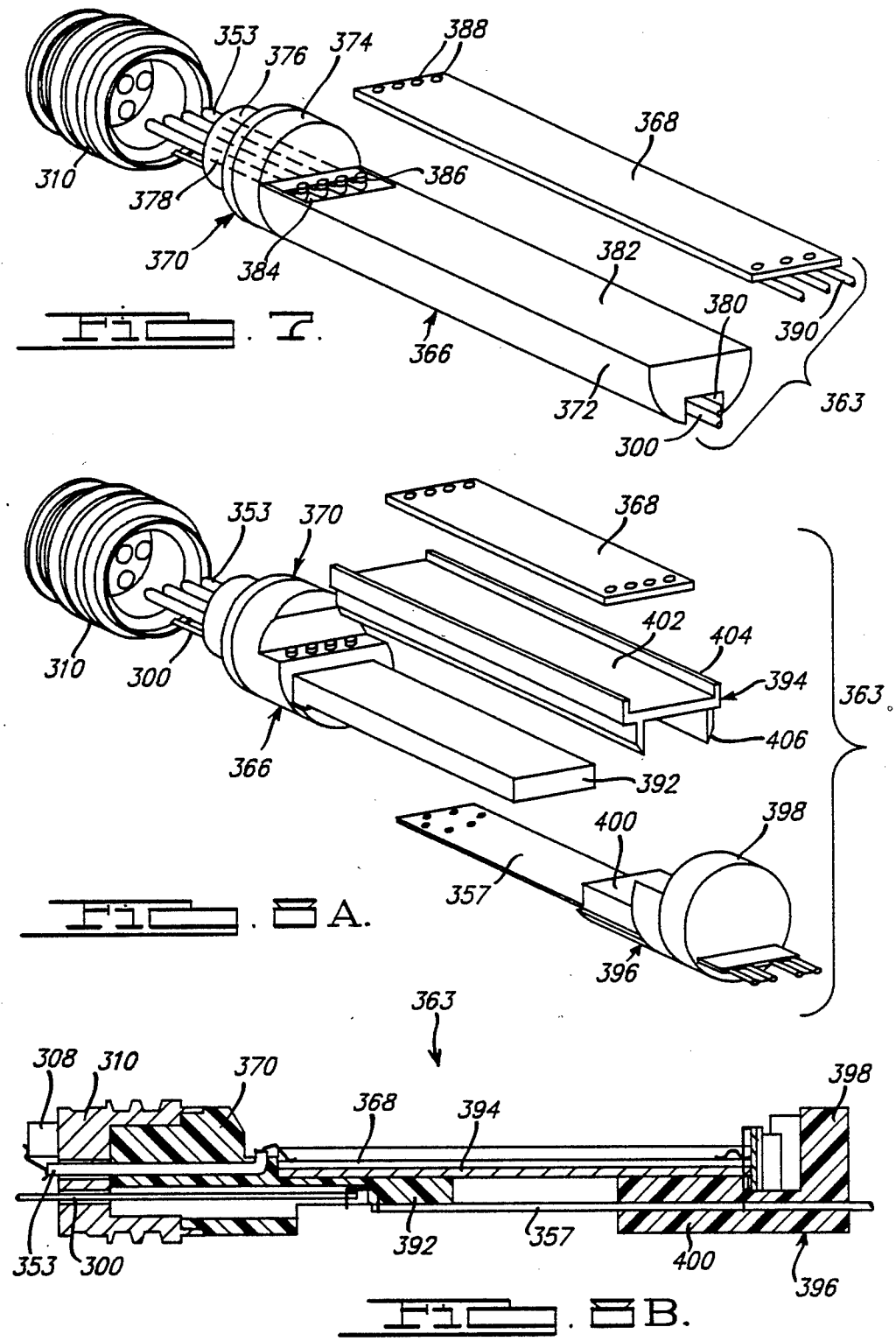

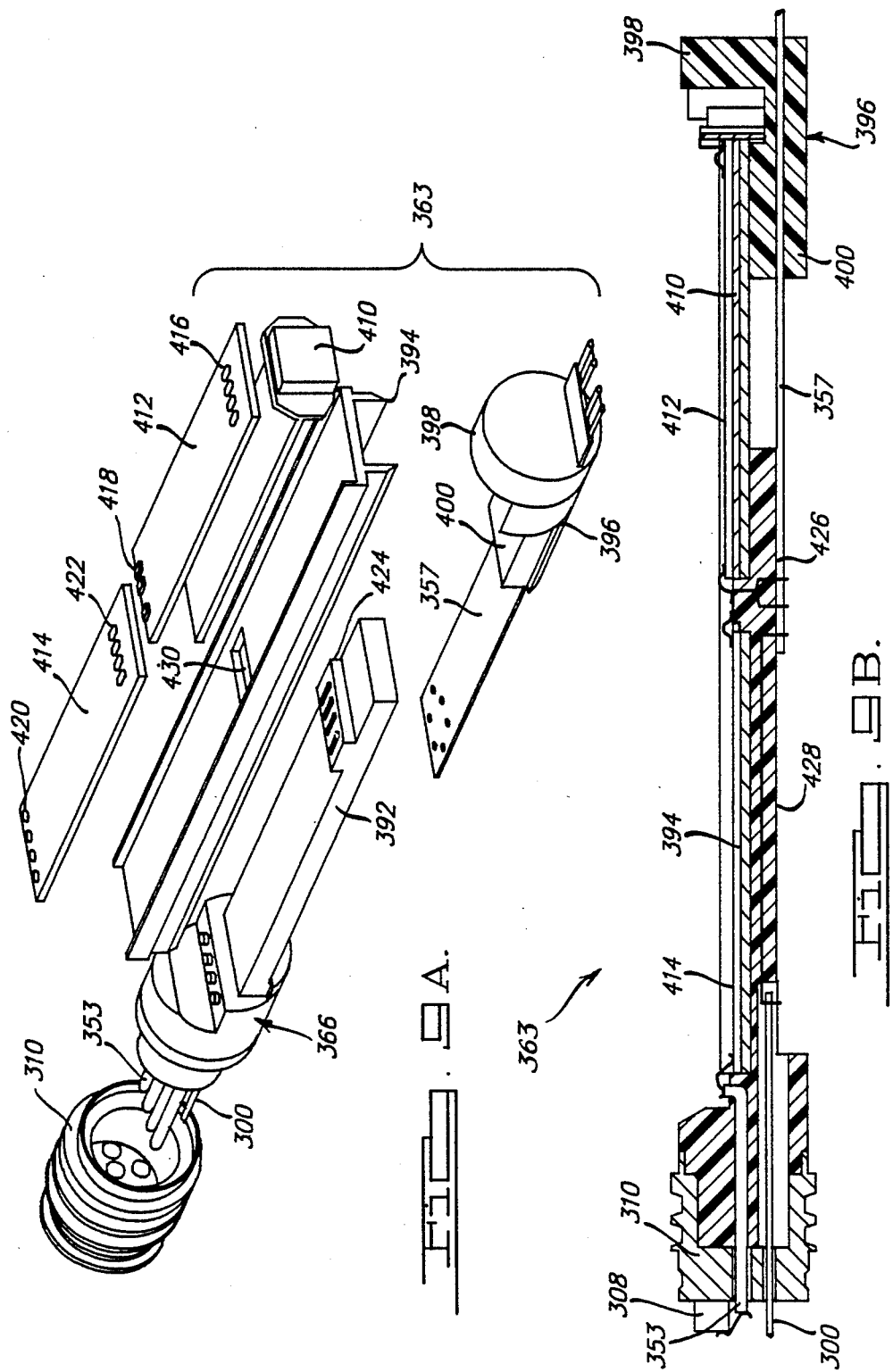

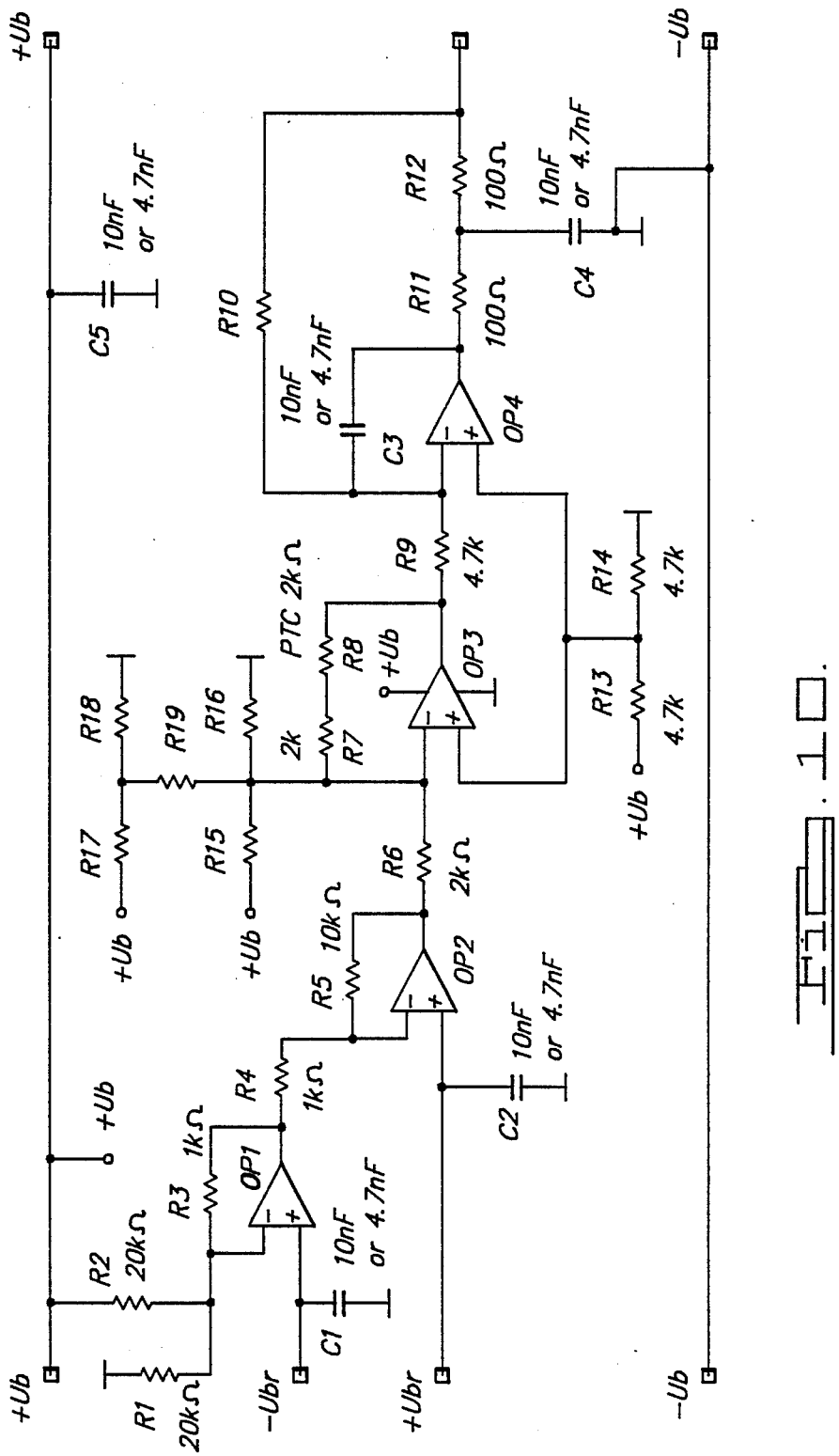

SIGNAL CONDITIONING CIRCUIT ASSEMBLY

BACKGROUND OF THE INVENTION

1. Field of the Invention

This invention relates to suspension systems for automobiles and machines which receive mechanical shock, and more particularly to a signal conditioning circuit assembly for shock absorbers.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw) For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European patent application Publication No. 0 186 908 A2. In European patent application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

SUMMARY OF THE INVENTION

Accordingly, it is the primary object of the present invention to provide a signal conditioning circuit assembly for a shock absorber in which the occurrence of a compression or rebound stroke may be determined by measuring the pressure differential between the damping fluid in the upper and lower portions of the working chamber (i e., the pressure difference across the piston of the shock absorber).

Another object of the present invention is to provide a signal conditioning circuit assembly for a shock absorber in which damping characteristics of the shock absorber are determined in part by the output of an accelerometer.

A further object of the present invention is to provide a signal conditioning circuit assembly for a shock absorber in which the sensors used for controlling damping characteristics may be disposed within the piston rod of the shock absorber.

A further object of the present invention is to provide a signal conditioning circuit assembly for a shock absorber which is relatively inexpensive yet is able to accurately control the damping forces provided by the shock absorber.

BRIEF DESCRIPTION OF THE DRAWINGS

Other objects of the present invention will become apparent to one skilled in the art upon reading the following specification and by reference to the following drawings in which:

FIGS. 6A and 6B is a cross-sectional view of a portion of the piston rod shown in FIG. 2 taken in the region immediately above the piston nut;

FIG. 7 is an exploded view of the first embodiment of the signal conditioning circuit assembly shown in FIG. 6B;

FIGS. 8A and 8B is an exploded view of the second embodiment of the signal conditioning circuit assembly shown in FIG. 6B;

FIGS. 9A and 9B is an exploded view of the third embodiment of the signal conditioning circuit assembly shown in FIG. 6B; and FIG. 10 is a schematic diagram of the circuit which may be used in conjunction with the circuit board shown in FIG. 7.

DESCRIPTION OF THE PREFERRED EMBODIMENT

Figure 1:
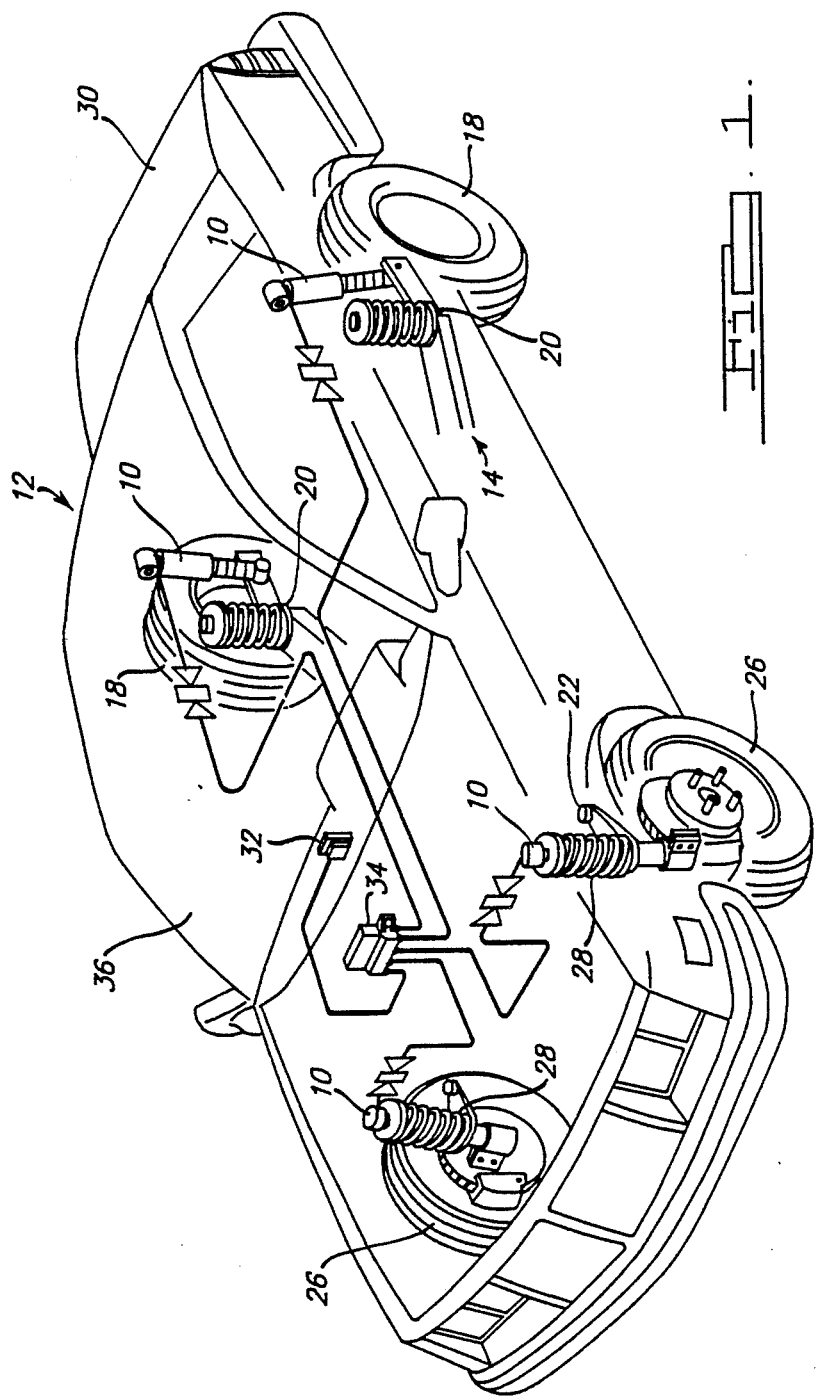
FIG. 1 is an illustration of an automobile using the method and apparatus for controlling shock absorbers according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts. In addition, the shock absorbers may be used with other types of suspension systems as well.

To allow the damping characteristics of the shock absorbers 10 to be controlled, a mode select switch 32 and select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. While the electronic control module 34 may be of the type described in Tenneco patent application 1316N-01495, other suitable electronic control modules may be used. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

Figures 2A, 2B:
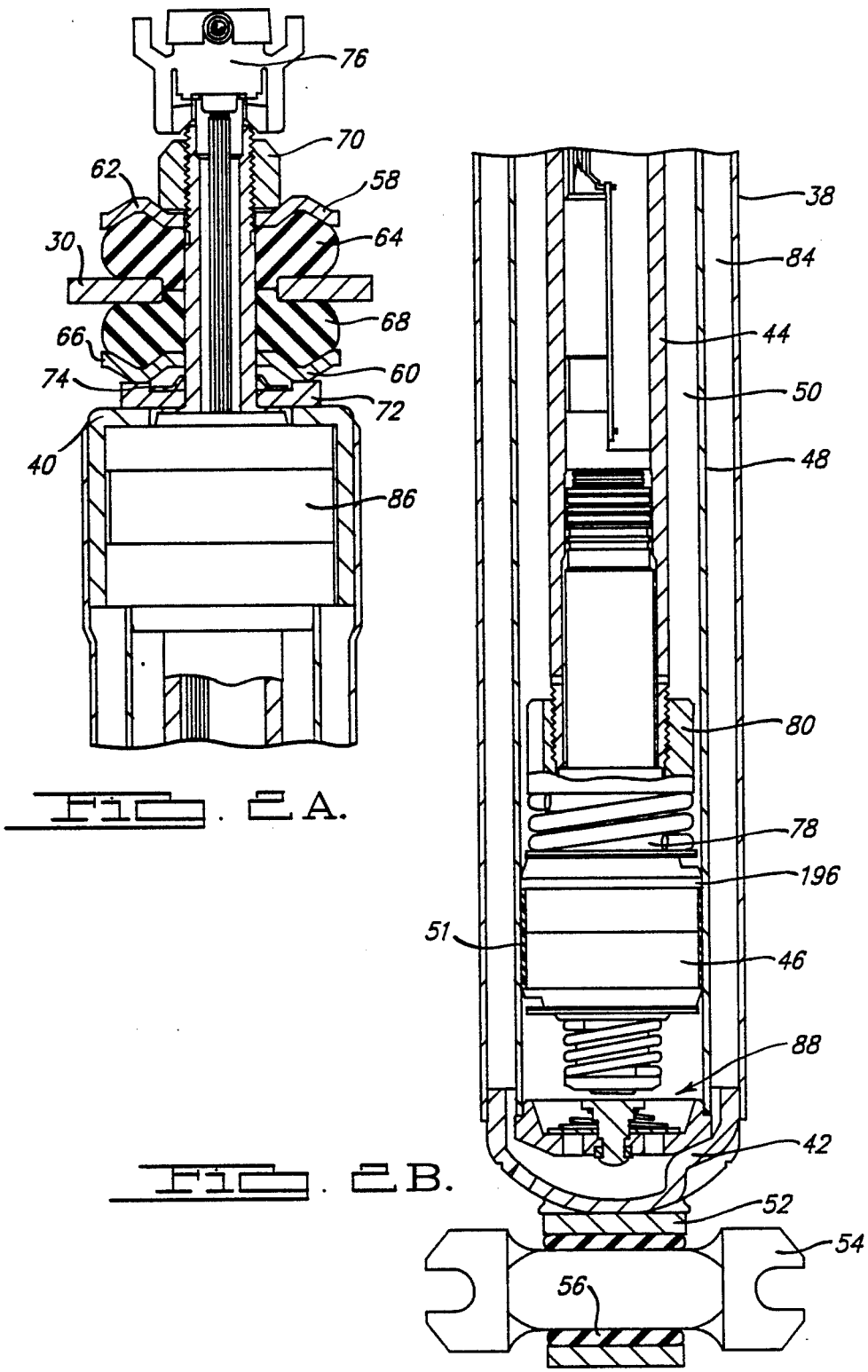
FIGS. 2A and 2B is the schematic representation of the shock absorber using the method and apparatus for controlling shock absorbers according to the teachings of the preferred embodiment of the present invention.

The structure of the shock absorbers 10 will now be described with reference to FIG. 2. The shock absorber 10 comprises an elongated reserve tube 38 which engages a cup-shaped oil cap 40 at the upper end of the reserve tube 38. The reserve tube 38 also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is disposed within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 44 and the pressure cylinder 48 is a teflon sleeve 51 which is used to facilitate movement of the piston assembly 46 with respect to pressure cylinder 48.

To connect the shock absorber 10 to the rear axle assembly of the automobile 12, the shock absorber 10 comprises a circular end fitting 52. The circular end fitting 52 is secured to the base cup 42 of the shock absorber 10 by a suitable means such as welding. Within the circular end fitting is disposed a mounting pin 54 disposed within a bushing 56 which is adapted to engage the axle assembly of the automobile 12. To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60.

The shock absorber 10 further comprises a self-locking nut 70 which is disposed on the piston rod 44 immediately above the first retainer 58. The self-locking nut 70 has an internally threaded bore which is able to threadably engage the threaded upper end portion of the piston rod 44. Accordingly, by rotating the self-locking nut 70 on the upper portion of the piston rod 44, both the first retainer 58 and the first cushion 64 are displaced in a direction toward the body 30 of the automobile 12.

The second retainer 60 is positionally secured in part by means of an annular spacer 72 which is disposed immediately above the oil cap 40. The spacer 72 has a central bore which is able to receive the upper end portion of the piston rod 44. A pal nut 74 is disposed between the second retainer 60 and the spacer 72. The pal nut 74 is generally disk shaped and has a central bore which is able to receive the piston rod 44. The pal nut 74 is used to locate and secure the spacer 72.

To permit electrical communication between the electronic control module 34 and the coil described below, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in FIGS. 8-10 of U.S. Ser. No. 105,404 filed on Oct. 5, 1987, now U.S. Pat. No. 4,846,318, issued July 11, 1989 though other suitable electrical connectors may be used.

To support the piston assembly 46 on the piston rod 44, an axially extending piston post 78 and a piston post rod nut 80 are provided. The piston post 78 is generally circular in cross-section and extends axially through the central bore 82 (see FIG. 5) of the piston assembly 46. The piston post 78 is secured to the piston rod 44 by the piston post rod nut 80. The piston post rod nut 80 is annularly shaped and comprises an internally threaded bore which is able to mate with the externally threaded lower portion of the piston rod 44.

To support the piston rod 44 within the working chamber 50 as well as to provide unidirectional flow of damping fluid through the damping fluid reservoir 84, a rod guide/valve assembly 86 is provided. The rod guide/valve assembly 86 allows fluid flow during compression of the shock absorber 10, while preventing the flow of damping during rebound of the shock absorber 10. The rod guide/valve assembly 86 may be of the type which is shown and described in conjunction with FIG. 10 of U.S. Ser. No. 322,542, filed Mar. 13, 1989, which is hereby incorporated by reference. However, it is to be understood that other suitable rod guide/valve assemblies may be used.

Figure 3:
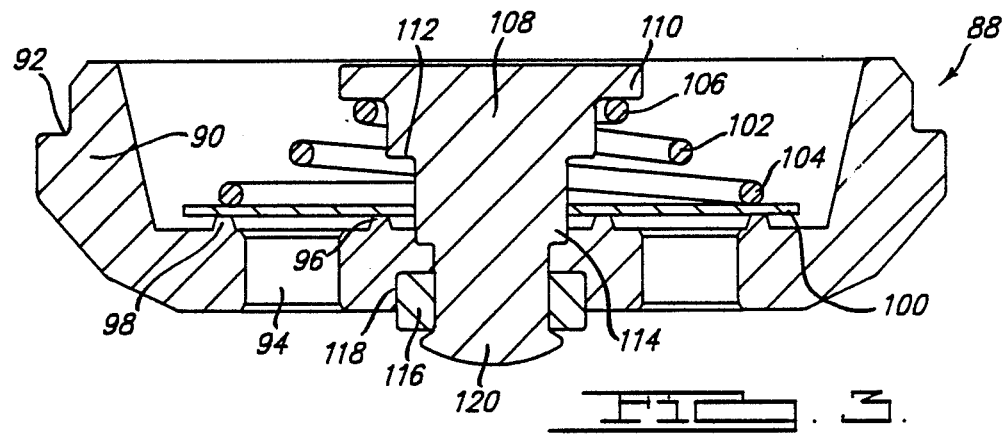
FIG. 3 is a cross-sectional view of the base valve shown in FIG. 2.

To allow damping fluid in the damping fluid reservoir 84 to flow into the working chamber 50, a base valve assembly 88 is provided as shown in FIG. 3. The base valve assembly 88 allows damping fluid to flow from the damping fluid reservoir 84 into the lower portion of the working chamber 50 during rebound. However, the base valve assembly 88 prevents the flow of damping fluid from the lower portion of the working chamber 50 to the damping fluid reservoir 84 through the base valve assembly 88 during compression. The base valve assembly 88 comprises a generally cup-shaped pressure cylinder end portion 90 which is disposed coaxially with, and adjacent to, the lower portion of the pressure cylinder 48. The end portion 90 contains a peripherally upwardly disposed recess 92 which is operable to engage the lower portion of the pressure cylinder 48. The pressure cylinder 48 is secured to the recess 92 by a suitable means such as a press fit.

The pressure cylinder end portion 90 comprises six upwardly disposed flow passages 94 which permit damping fluid to flow through the pressure cylinder end portion 90. The base valve assembly 88 further comprises first and second upwardly disposed annular projections 96 and 98 which are disposed on the upper surface of the pressure cylinder end portion 90. The upwardly disposed annular projection 96 extends coaxially with the axial center line of the pressure cylinder end portion 90 and resides adjacent to the radially inwardmost edge of the flow passages 94. Similarly, the upwardly disposed annular projection 98 extends coaxially with respect to the axial center line of the pressure cylinder end portion 90 and is adjacent to the radially outwardmost edge of the flow passages 94.

The flow of damping fluid through the flow passages 94 is regulated by an intake disk 100. The intake disk 100 is located perpendicular to the axial center line of the pressure cylinder end portion 90. Furthermore, the intake disk 100 rests on the upwardly disposed annular projections 96 and 98 when no damping fluid is flowing through the flow passages 94. Accordingly, the intake disk 100 is able to prevent the flow of damping fluid through the flow passages 94 while the intake disk 100 rests on the upwardly disposed annular projections 96 and 98.

To bias the intake disk 100 against the upwardly disposed annular projections 96 and 98, the base valve assembly 88 also comprises a tapered helical intake spring 102. The intake spring 102 is disposed coaxially with the axial center line of the pressure cylinder end portion 90, with the lower portion 104 of the intake spring 102 resting against the upper surface of the intake disk 100. The diameter of the lower portion 104 of the intake spring 102 is larger than the diameter of the upper portion 106 of the intake spring 102 so that the lower portion 104 of the intake spring 102 extends proximate to the radially outwardmost periphery of the intake disk 100. Because the lower portion 104 of the intake spring 102 biases the intake disk 100 against the upwardly disposed annular projections 96 and 98, damping fluid is able to flow through the flow passages 94 only when the force exerted by the damping fluid in the flow passages 94 is large enough to overcome the biasing force provided by the intake spring 102.

To secure the upper end of the intake spring 102 within the base valve assembly 88, the base valve assembly 88 further comprises a base valve pin 108. The base valve pin 108 extends through and is disposed coaxially with the axial center line of the pressure cylinder end portion 90. The base valve pin 108 also extends through a central aperture in the intake disk 100 so that the base valve pin 108 can prevent lateral movement of the intake disk 100. The upper portion of the base valve pin 108 includes a first flange portion 110 which extends perpendicularly with respect to the axial center line of the base valve pin 108. The upper surface of the intake spring 102 rests on the lower surface of the first flange portion 110 so as to secure the intake spring 102 within the base valve assembly 88.

The base valve pin 108 further comprises a second flange portion 112 and a third flange portion 114. Because the second flange portion 112 extends a greater radial distance than the central aperture of the intake disk 100 through which the base valve pin 108 extends, the flange portion 112 may limit upward movement of the intake disk 100. The third flange portion 114 extends a greater radial distance than the aperture of the pressure cylinder end portion 90 through which the base valve pin 108 extends. Accordingly, the third flange portion 114 limits downward movement of the base valve pin 108 with respect to the pressure cylinder end portion 90.

Upward movement of the base valve pin 108 is limited by an annular base valve insert 116 which is disposed within a central annular recess 118 on the lower surface of the pressure cylinder end portion 90. The base valve insert 116 is disposed coaxially with the axial center line of the base valve pin 108 and is disposed on the radial periphery of the base valve pin 108. Because the lower portion of the base valve pin 108 has a deformed head portion 120 having a greater radial diameter than the internal diameter of the base valve insert 116, the base valve insert 116 prevents upward movement of the base valve pin 108 with respect to the pressure cylinder end portion 90.

Figure 4A:
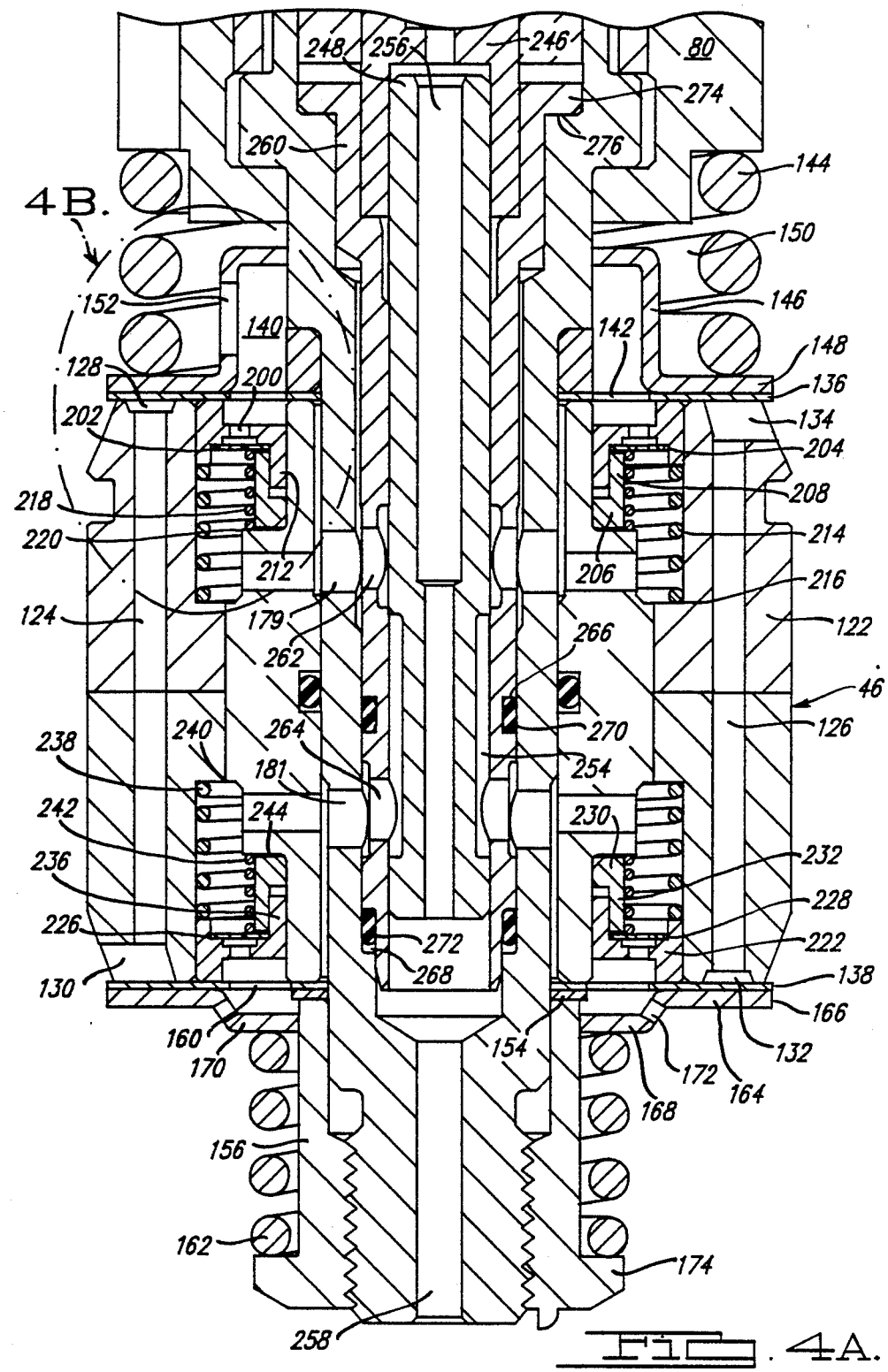
FIGS. 4A, 4B and 4C are cross-sectional views of the piston assembly and the lower portion of the piston post shown in FIG. 2.

The piston assembly 46 will now be described in greater detail with reference to FIGS. 4A, 4B and 4C. The piston assembly 46 is used for controlling the flow of damping fluid between the upper and lower portions of the working chamber 50. The piston assembly 46 comprises a valve body 122 having a first and second plurality of vertical flow passages 124 and 126. Each of the flow passages 124 comprises a valve controlled upper outlet end portion 128 and a lower counter-recessed inlet end portion 130. Similarly, each of the flow passages 126 comprise a valve controlled lower outlet end portion 132 and an upper counter-recessed inlet end portion 134.

To allow the piston assembly 46 to regulate the flow of damping fluid between the upper and lower portions of the working chamber 50, an upper spring disk 136 and a lower spring disk 138 are provided. The upper spring disk 136 is disposed adjacent to the upper outlet end portion 128 of the flow passages 124, as well as the upper inlet end portion 134 of the flow passages 126. In addition, the upper surface of the spring disk 136 is adjacent to an annular spacer 140 which is coaxially disposed on the periphery of the piston post 78. Accordingly, the spacer 140 and the piston assembly 46 prevent movement of the radially inward portion of the upper spring disk 136. The upper spring disk 136 further has a flow passage 142 which allows damping fluid to flow therethrough which is used to bias the spring disks 136 and 138 in a manner described below.

To place a biasing force on the upper surface of the upper spring disk 136, a first helical valve spring 144 and a annularly shaped spring seat 146 are provided. The spring seat 146 has a radially extending portion 148 as well as an axially extending portion 150. The radially extending portion 148 is disposed adjacent to the upper surface of the upper spring disk 136 and extends from the outer radial surface of the flow passage 142 to the radially outer edge of the upper spring disk 136. The axially extending portion 150 of the spring seat 146 extends from the radially extending portion 148 in an axially direction to a position immediately below the piston post rod nut 80. The axially extending portion 150 further comprises a flow passage 152 which allows damping fluid in the upper portion of the working chamber 50 to flow therethrough so as to provide the necessary biasing forces in the manner described below.

The helical valve spring 144 is disposed between the piston post rod nut 80 and the upper surface of the radially extending portion 148 of the spring seat 146. Since the valve spring 144 is in compression, the valve spring 144 forces the radially extending portion 148 of the spring seat 146 against the upper surface of the spring disk 136, which in turn forces the lower surface of the spring disk 136 against the upper outlet end portion 128 of the vertical flow passages 124.

The lower spring disk 138 is disposed adjacent to the lower surface of the piston assembly 46 adjacent to the lower outlet end portion 132 of the vertical flow passages 126 as well as the lower inlet end portion 130 of the vertical flow passages 124. The lower spring disk 138 is upwardly secured by the upper surface of the valve body 122, and is downwardly secured by a disk-shaped spacer 154 which is disposed coaxially above a piston nut 156 which threadably engages the externally threaded lower end portion of the piston post 78. Accordingly, the inner radial periphery of the lower spring disk 138 is secured between the spacer 154 and the valve body 122 by the piston nut 156. The lower spring disk 138 comprises a flow passage 160 which allows damping fluid in the lower portion of the working chamber 50 to flow therethrough. As will be described more thoroughly below, damping fluid flowing through the flow passage 160 is used for varying the biasing force applied to the upper spring disk 136 and thus the valve spring 144.

To provide biasing forces on the outer periphery of the lower spring disk 138, a second valve spring 162 and a spring seat 164 are provided. The spring seat 164 comprises a first radially extending portion 166 as well as a second radially extending portion 168. The first radially extending portion 166 is disposed coaxially above the second radially extending portion 168 and is connected thereto by the step portion 170. The step portion 170 further has a flow passage 172 which allows damping fluid to flow therethrough in a manner described below.

The second valve spring 162 is disposed adjacent to the outer periphery of the upper portion of the piston nut 156 with the upper surface of the valve spring 162 resting on the lower surface of the second radially extending portion 168 of the spring seat 164. The lower surface of the valve spring 162 rests on the upper surface of a radially extending flange portion 174 of the piston post 78. Because the valve spring 162 is in compression, the valve spring 162 places an upward biasing force on the spring seat 164 which places an upwardly directed biasing force on the lower spring disk 138. Accordingly, the lower spring disk 138 is able to limit the flow of damping fluid flowing through the flow passages 126 during rebound.

Figure 5:
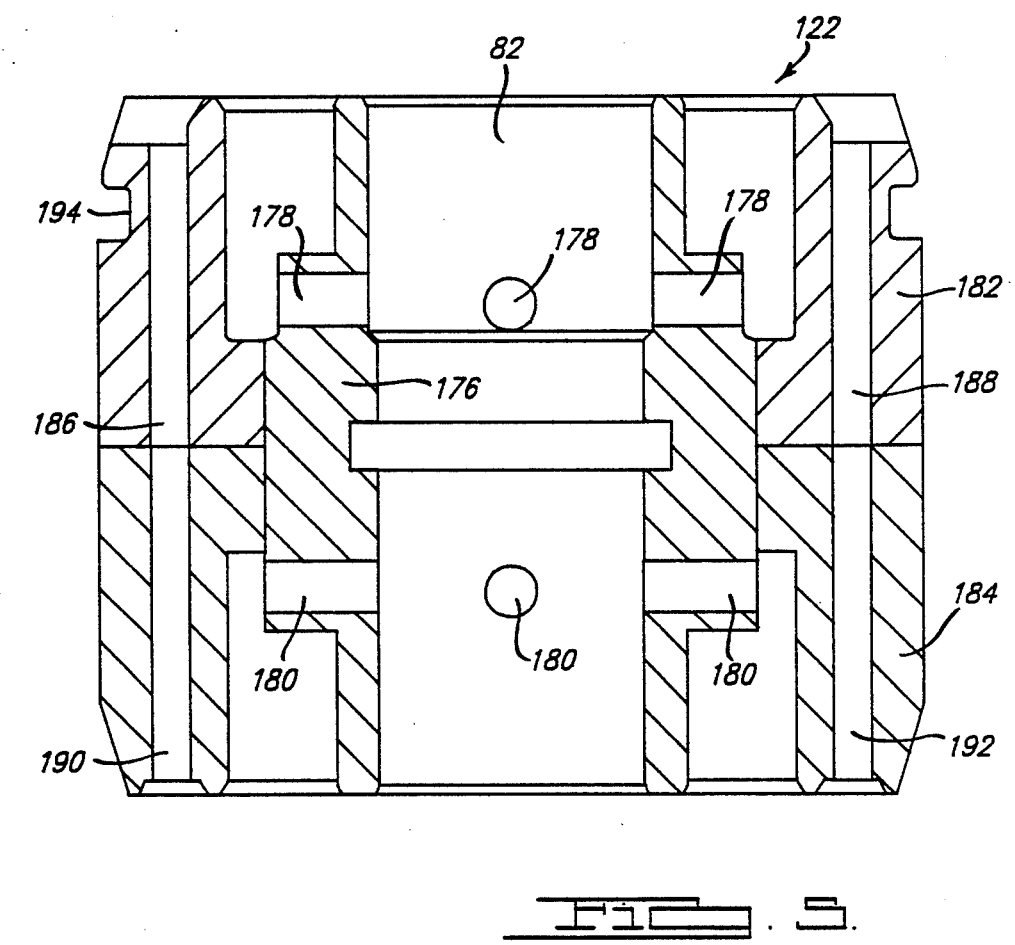
FIG. 5 is a cross-sectional view of the inner piston subassembly as well as the first and second outer piston subassemblies shown in FIG. 2.

The valve body 122 comprises an annular inner piston subassembly 176 as shown in FIG. 5. The annular inner piston subassembly 176 is disposed coaxially with the axial center line of the piston post 78, and is disposed on the outer radial periphery of the piston post 78 between the upper spring disk 136 and the lower spring disk 138. The inner piston subassembly 176 comprises a first plurality of flow passages 178 as well as a second plurality of flow passages 180. The first and second plurality of flow passages 178 and 180 radially extend from the axial center line of the inner piston subassembly 176. In addition, the center lines of the first plurality of flow passages 178 lie in a plane which is perpendicular to the axial center line of the inner piston subassembly 176. The center lines of the second plurality of flow passages 180 also reside in a plane which is perpendicular to the axial center line of the inner piston subassembly 176, though the flow passages 180 are displaced axially downward from the flow passages 178. The flow passages 178 fluidly communicate with a plurality of radially extending flow passages 179 which are disposed in the piston post 78, while the flow passages 180 communicate with a plurality of flow passages 181 also disposed in the piston post 78. The axial center lines of the flow passages 178 are colinear with the axial center lines of the flow passages 179, while the axial center lines of the flow passages 180 are colinear with the axial center lines of the flow passages 181.

The valve body 122 also comprises a first outer annular piston subassembly 182 and a second outer annular piston subassembly 184. The first and second outer annular piston subassemblies 182 and 184 are disposed on the radial outer peripheral edge of the inner piston subassembly 176 at a position proximate to the plane perpendicular to the axial center line of the piston assembly 46 dividing the inner piston subassembly 176 into similar portions. The first outer annular piston subassembly 182 comprises a plurality of flow passages 186 and 188 which extend coaxially with the axial center line of the piston post 78. In addition, the second outer annular piston subassembly 184 comprises a plurality of flow passages 190 and 192 which also extend coaxially with the axial center line of the piston post 78. Because the flow passages 186 of the first outer annular piston subassembly 182 are coaxial with the flow passages 190 of the second outer annular piston subassembly 184, the flow passages 186 and 190 form the vertical flow passages 124 as shown in FIG. 4A. Similarly, the flow passages 188 of the first outer annular piston subassembly 182 are coaxial with the flow passages 192 of the second outer annular piston subassembly 184 so as to form the flow passages 126 also shown in FIG. 4A.

The first outer annular piston subassembly 182 further comprises an annular groove 194 disposed on the radially outer surface of the subassembly 182. The annular groove 194 is of sufficient depth to secure the seal 196 (see FIG. 2B) disposed between the pressure cylinder 48 and the first outer annular piston subassembly 182. The annular inner piston subassembly 176, the first outer annular piston subassembly 182, as well as the second outer annular piston subassembly 184 may be rigidly secured to each after formation of the flow passages 178 and 180 by copper infiltration. Accordingly, difficulties otherwise encountered in forming the flow passages 178 and 180 if the subassemblies 176, 182 and 184 were initially an integral unit are reduced.

To vary the biasing force applied to the upper spring disk 136, an upper outer annular unloader 198 is provided. The radially inward surface of the upper outer unloader 198 is disposed on the radially outer surface of the upper portion of the inner piston subassembly 176. The radially outer surface of the upper outer unloader 198 mechanically communicates with the lower surface of the upper spring disk 136, and has a radially extended surface which mechanically communicates with the radially inner surface of the first outer annular piston subassembly 182. The central portion of the upper outer unloader 198 includes a flow passage 200 as well as a valve seat 202. The valve seat 202 is used to prevent upward movement of a valve disk 204 which is used to limit the flow of damping fluid through the flow passage 200 in a manner described below.

To positionally secure the inner periphery of the valve disk 204, an upper inner unloader 206 is provided. The upper inner unloader 206 is disposed on the outer radial periphery of the upper portion of the inner piston subassembly 176. The upper inner unloader 206 comprises an axially extending portion 208 having a radially inward surface which is disposed adjacent to a radially outward surface of a downwardly extending projection 212 of the upper outer unloader 198. Furthermore, the upper inner unloader 206 is disposed so that the upwardmost surface of the upper inner unloader 206 is proximate to a radially inwardmost portion of the valve disk 204 thereby securing the valve disk 204 between the upper outer unloader 198 and the upper inner unloader 206.

To bias the upper outer unloader 198 against the upper spring disk 136, a helical coil spring 214 is provided. The helical coil spring 214 is disposed coaxially between the lower surface of the radially outwardmost portion of the upper outer unloader 198 and a step portion 216 in the first outer piston subassembly 182. Because the spring 214 is in compression, the spring 214 biases the upper outer unloader 198 against the lower surface of the upper spring disk 136. In addition, to bias the valve disk 204 against the valve seat 202, a helical spring 218 is provided. The spring 218 is disposed coaxially with the axial center line of the piston post 78 adjacent to the upper inner unloader 206. Upward movement of the spring 218 is limited by the valve seat 202, while downward movement of the spring 218 is limited by a step 220 which is disposed on the outer surface of the inner piston subassembly 176. The spring 218 is used to bias the valve disk 204 against the valve seat 202.

Figure 4B:
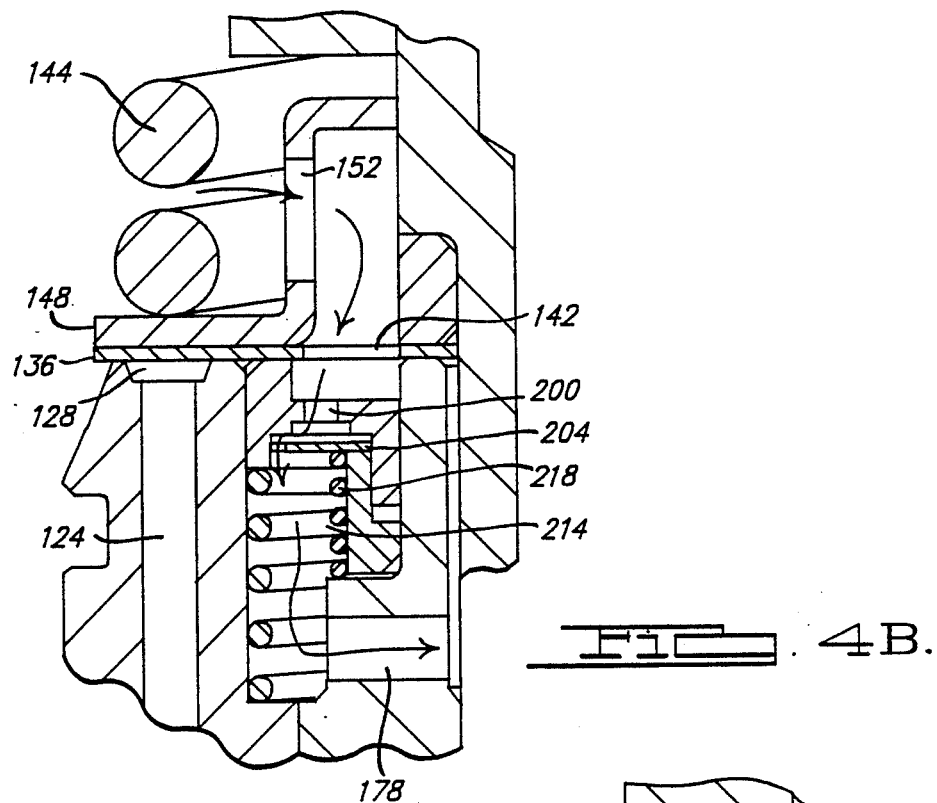
Figure 4C:
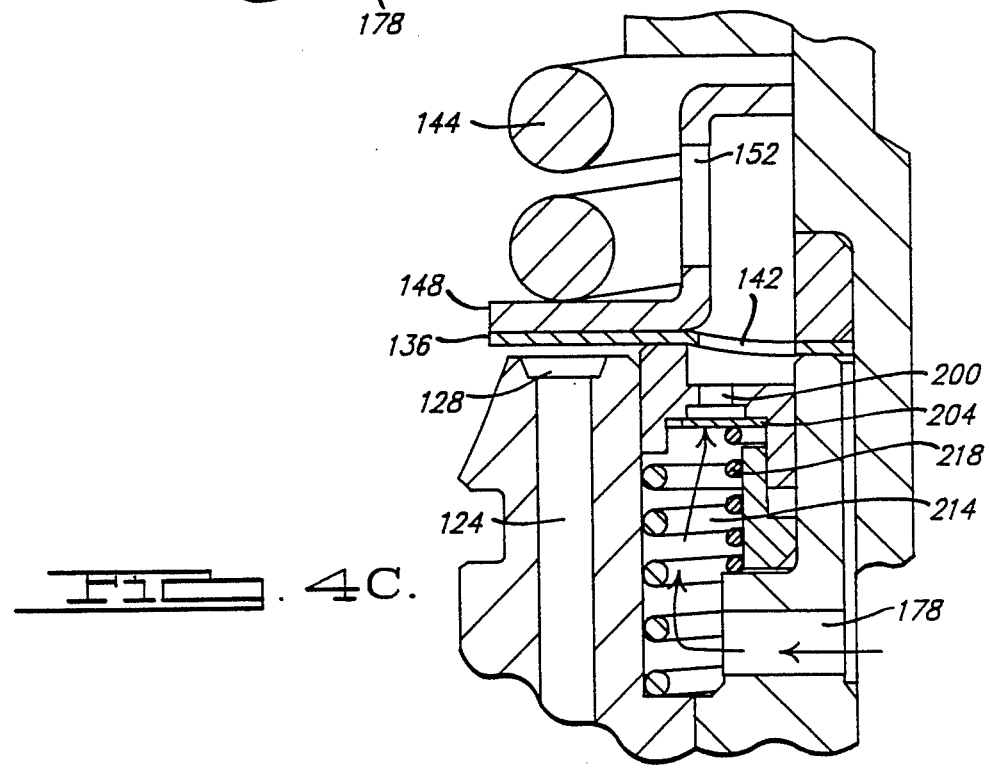

To vary the biasing force applied to the lower spring disk 138, a lower outer annular unloader 222 is provided (see FIGS. 4B and 4C). The radially inward surface of the lower outer unloader 222 is disposed on the radially outer surface of the lower portion of the inner piston subassembly 176. The radially outer portion of the lower outer unloader 222 has an upper surface which mechanically communicates with the upper surface of the lower spring disk 138, and has a radially extended surface which mechanically communicates with the second outer annular piston subassembly 184. The central portion of the lower outer unloader 222 includes a flow passage 224 as well as a valve seat 226. The valve seat 226 is used to prevent downward movement of a valve disk 228 which is used to limit the flow of damping fluid through the flow passage 224 in a manner described below.

To positionally secure the inner periphery of the valve disk 228, a lower inner unloader 230 is provided. The lower inner unloader 230 is disposed on the outer radial periphery of the lower portion of the inner piston subassembly 176. The lower inner unloader 230 comprises an axially extending portion 232 having a radially inward surface which is disposed adjacent to a radially outward surface of a upwardly extending projection 236 of the lower outer unloader 222. Furthermore, the lower inner unloader 230 is disposed so that the lowermost surface of the lower inner unloader 230 is proximate to a radially inwardmost portion of the valve disk 228 thereby securing the valve disk 228 between the lower outer unloader 222 and the lower inner unloader 230.

To bias the lower outer unloader 222 against the lower spring disk 138, a helical coil spring 238 is provided. The helical coil spring 238 is disposed coaxially between the upper surface of the radially outwardmost portion of the lower outer unloader 222 and a step portion 240 in the second outer piston subassembly 184. Because the spring 238 is in compression, the spring 238 biases the lower outer unloader 222 against the lower spring disk 138. In addition, to bias the valve disk 228 against the valve seat 226, a helical spring 242 is provided. The spring 242 is disposed coaxially with the axial center line of the piston post 78 adjacent to the lower inner unloader 230. Upward movement of the spring 242 is limited by the valve seat 226, while downward movement of the spring 242 is limited by a step 244 which is disposed on the outer surface of the inner piston subassembly 176. The spring 242 is used to bias the valve disk 228 against the valve seat 226.

To control the flow of damping fluid between the first plurality of flow passages 178 and the second plurality of flow passages 180 in the inner piston subassembly 176, an annular upper plunger member 246 and an annular lower plunger member 248 are provided. The upper plunger member 246 is annular in shape and is disposed coaxially within the piston post 78. Disposed between the upper and lower surfaces of the upward plunger member 246 is a radially inwardly disposed step portion 250 which is used to seat a spring described below which bias the upper plunger member 246 in a downward direction. In addition, the upper plunger member 246 further comprises a pressure passage 252 which is axially disposed on the center line of the upper plunger member 246 and allows damping fluid to fluidly communicate therethrough. The lower portion of the upper plunger member 246 is secured to the upper portion of the lower plunger member 248 by a suitable means such as by welding.

The lower plunger member 248 is disposed coaxially within the piston post 78 and is cylindrical in cross-section. The lower plunger member 248 includes a region 254 located at the lower end of the lower plunger member 248 which has a reduced external radius. The region is used to allow damping fluid to flow between the flow passages 178 and 180 in the manner described below. In addition, the lower plunger member 248 includes a pressure passage 256 which allows damping fluid in the lower portion of the working chamber 50 to fluidly communicate with the pressure passage 252 of the upper plunger member 246 through the pressure passage 258 located at the lower end of the piston post 78.

To house the lower plunger member 248, a plunger housing 260 is provided. The plunger housing 260 is disposed on the inner periphery of the piston post 78 and extends coaxially therewith. The plunger housing 260 comprises a plurality of upper flow passages 262 and a plurality of lower flow passages 264. The upper flow passages 262 fluidly communicate with the flow passages 178 in the inner piston subassembly 176, as well as the flow passages 179 in the piston post 78. In addition, the lower flow passages 264 in the plunger housing 260 fluidly communicate with the second plurality of flow passages 180 in the inner piston subassembly 176, as well as the flow passages 181 in the piston post 78. Furthermore, the upper flow passages 262 are able to fluidly communicate with the lower flow passages 264 when the lower plunger member 248 is displaced sufficiently in an upward direction so that the region 254 of the lower plunger member 248 having a reduced external diameter is proximate to both the upper flow passages 262 and the lower flow passages 264.

The plunger housing 260 further comprises an upper annular groove 266 and a lower annular groove 268. Both the grooves 266 and 268 are disposed around the radial outer periphery of the plunger housing 260 adjacent to the piston post 78. The groove 266 is disposed between the upper flow passages 262 and the lower flow passages 264 in the plunger housing 260, while groove 268 is disposed between the lower flow passage 264 and the lowermost portion of the plunger housing 260. Disposed within the groove 266 is an annular seal 270 which prevents damping fluid from flowing between the plunger housing 260 and the piston post 78. Further, an annular seal 272 is disposed in the groove 268 which also prevents damping fluid from flowing between the plunger housing 260 and the piston post 78.

To limit downward movement of the plunger housing 260, the plunger housing 260 has a radial extending flange 274 disposed at the upper portion thereof. The flange 274 rests on a radially extending step portion 276 of the piston post 78. Because the internal diameter of the piston post 78 in the region proximate to the step portion 276 is less than the diameter of the radially outwardmost surface of the flange 274, the step portion 276 prevents the flange 274 and hence the plunger housing 260 from being displaced in a downward direction. Upward movement of the plunger housing 260 is limited by an annular spacer 278 which is disposed adjacent to the upper surface of the flange 274 of the plunger housing 260. The spacer 278 is disposed adjacent to the radially outward surface of the upper plunger member 246 and is also adjacent to the radially inwardmost surface of the piston post 78.

To cause movement of the lower plunger member 248 within the plunger housing 260, an annular coil 286 is provided. The annular coil 286 is disposed on the inner periphery of the piston post 78 at a position above the spacer 278. The coil 286 is formed around an annular coil sleeve 288 which resides on the inner periphery of the coil 286 and is located approximate to the radially outer surface of the upper plunger member 246. In addition, the annular coil 286 comprises a pressure passage 289 disposed axially through the sleeve 288 which permits damping fluid to fluidly communicate between the lower portion of the working chamber 50 and the pressure sensor described below.

As those skilled in the art will recognize, the upper plunger member 246, the lower plunger 248 and the coil 286 form a solenoid. The application of current to the coil 286 will cause the upper plunger member 246 to be upwardly displaced thereby causing the region 254 of the lower plunger member 248 to be proximate to the upper flow passages 262, as well as the lower flow passages 264. When this occurs, damping fluid is able to flow from the upper portion of the working chamber 50 to the area immediately above the lower outer unloader 222 during rebound through the following path passages: the flow passage 152, the flow passage 142, the flow passage 200, the flow passage 178, the flow passage 179, the flow passage 262, the flow passage formed between the region 254 and the plunger housing 260, the flow passage 264, the flow passage 181, and the flow passage 180. When this occurs, the increased pressure caused by fluid flowing through these flow passages causes the biasing forces exerted on the lower outer unloader 222 to increase, thereby causing the lower outer unloader 222 and hence the lower spring disk 138 to be displaced in a downward direction. More damping fluid is therefore able to flow through the flow passages 126 thereby decreasing the damping forces which the piston assembly 46 generates so as to provide a soft rebound stroke.

When the piston assembly 46 is in compression, damping fluid is able to flow through the following flow passages from the lower portion of the working chamber 50 to the region immediately below the upper outer unloader 198: the flow passage 172, the flow passage 160, the flow passage 224, the flow passage 180, the flow passage 181, the flow passage formed between the region 254 and the plunger housing 260, the flow passage 262, the flow passage 179, and the flow passage 178. When this occurs, the increased pressure caused by the fluid flowing through these flow passages cause the biasing forces exerted on the upper outer unloader 198 to increase (see FIG. 4C), thereby increasing the biasing force exerted on the upper spring disk 136 in an upward direction. Accordingly, a greater amount of damping fluid is able to flow through the flow passages 124 to thereby cause a soft compression stroke.

When the lower plunger member 248 is displaced downward in such a manner that the region 254 is not proximate to the flow passages 262 and 264, damping fluid is unable to flow between the upper portion of the working chamber 50 to the area above the lower outer unloader 222 during rebound, nor is able to flow from the lower portion of the working chamber 50 to the area immediately below the upper outer unloader 198 during compression. Accordingly, the only biasing forces exerted on the upper spring disk 136 is that which is exerted primarily by the spring 144 as the forces exerted by the springs 214 and 218 are negligible. Similarly, the only biasing force acting on the lower spring disk 138 is that which is generated primarily by the spring 162 as the forces exerted by the springs 238 and 242 are negligible. Accordingly, a firm rebound and compression stroke will be generated.

Figure 6A:
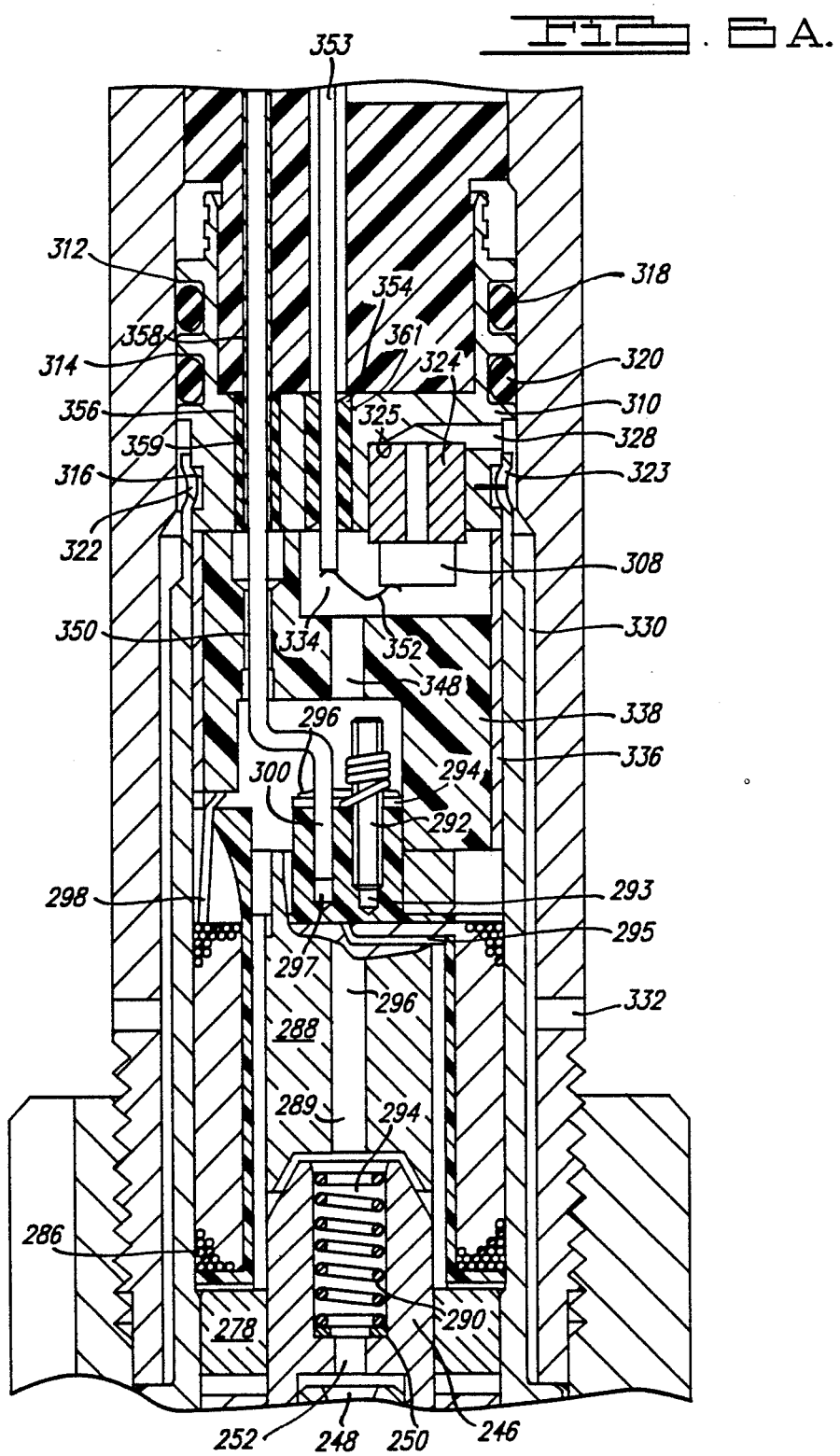

To bias the upper plunger member 246 and the lower plunger member 248 in a downward direction, a helical spring 290 is provided which is disposed coaxially within the upper plunger member 246. The lower portion of the helical spring 290 rests on the step portion 250 of the upper plunger member 246. The upper portion of the spring 290 rests on the lower surface of the annular coil sleeve 288. To allow the coil 286 to receive current from the electronic control module 34, the shock absorber 10 further comprises a pin 292. The pin 292 is disposed in a bore 293 which extends downwardly from the upper surface 294 of the annular coil sleeve 288. Wound around the upper portion of the pin 292 is a first lead 295 from the coil 286. A solder region 296 allows electrical communication between the lead 295 and one of two conductors 300 which is disposed within the bore 297 and used to allow electrical communication between the lead 295 and a flex circuit described below. While only one pin 292 is shown in FIG. 6A, it will be understood that another pin similar to pin 292 exists on the annular coil sleeve 288 which is able to accommodate the second lead 297 from the coil 286. The second lead 297 is therefore able to electrically communicate with another of the conductors 300.

To determine whether the shock absorber 10 is in compression or rebound, a pressure sensor 308 is provided. The pressure sensor 308 is electrically connected to the signal conditioning circuits described below through four conductors 353 which are electrically connected to the pressure sensor 308 via the leads 352. The pressure sensor 308 is supported in the piston rod 44 by a header 310 which is disposed in the piston rod 44 at a position above the annular coil 286. The header 310 is annularly shaped and has three radially extending grooves 312, 314 and 316 on the outer periphery thereof. The groove 312 is used to accommodate an annular seal 318 which is disposed in the groove 312 between the piston rod 44 and the header 310. In addition, the groove 314 is used to accommodate an annular seal 320 which is also disposed between the piston rod 44 and the header 310, though at a position below the seal 318. The groove 316 is used to accommodate a radially inwardly directed tab 322 which is disposed at the upper end of the piston post 44. Because the groove 316 engages the tab 322, the tab 322 prevents movement of the header 310 within the piston rod 44. An anti-rotation pin 323 extends radially inward through the tab 322 and engages the header 310 so as to prevent rotational movement of the header 310 with respect to the piston post 78.

The pressure sensor 308 is secured to the lower surface of the header 310 by means of an annular tube 324 which is preferably fabricated from Kovar. The annular tube 324 is disposed in an upwardly extending bore 325 extending upwardly from the lower surface of the header 310. The annular tube 324 may be preferably secured to the bore 325 by epoxy cement, and the pressure sensor 308 may also be preferably secured to the lower surface of the annular tube 324 by epoxy cement. To allow the upper surface of the pressure sensor 308 to receive damping fluid from the upper portion of the working chamber 50, the header 310 includes a radially extending pressure passage 328. The pressure passage 328 allows damping fluid to fluidly communicate between the upper surface of the pressure sensor 308 and pressure passage 330 which is the region between the piston rod 44 and the piston post 78. The pressure passage 330 in turn fluidly communicates with the pressure passage 332 which extends radially through the piston rod 44 into the upper portion of the working chamber 50. Accordingly, damping fluid from the upper portion of the working chamber 50 is able to fluidly communicate with the upper surface of the pressure sensor 308 through the pressure passage 328, the pressure passage 330 and the pressure passage 332.

To allow the lower surface of the pressure sensor 308 to be exposed to damping fluid at the same pressure as that which is in the lower portion of the working chamber 50, a pressure cavity 334 is provided. The pressure cavity 334 is disposed immediately adjacent to the lower surface of the pressure sensor 308. The upper surface of the pressure cavity 334 is formed by the header 310, while the sides of the pressure cavity 334 are formed in part by an annulus 336 which is disposed adjacent to the inside periphery of the piston post 78 at a position immediately below the header 310. The lower surface of the pressure cavity 334 as well as a portion of the side of the pressure cavity 334 is formed by a spacer 338 which will be more thoroughly described below.

The spacer 338 is disposed in the piston rod 44 between the pressure sensor 308 and the coil 286. To allow damping fluid in the pressure passage 289 of the annular coil 286 to fluidly communicate with the pressure cavity 334, the spacer 338 further comprises a central bore 348. The central bore 348 extends axially through the spacer 338 from the pressure cavity 334 to the region immediately adjacent the coil 286. In addition, the spacer 338 includes a bore 350 which extends also axially through the spacer 338. The bore 350 permits one of the conductors 300 from the coil 286 to pass through the spacer 338. A second bore (not shown) similar to the bore 350 is also located in the spacer and allows another of the conductors 300 to pass therethrough.

To allow the conductors 300 of the coil 286 and the conductors 353 from the pressure sensor 308 to pass through the header 310, the header 310 has four bores 354 and two bores 356 which extend axially through the header 310. Each of the bores 356 is sufficient to accommodate one of the two conductors 300 as it passes through the header 310.

In addition, the bores 356 are sufficiently large to accommodate a plurality of axially extending tubes 358 each of which extend through one of the bores 356. The tubes 358 are used to facilitate electrical connection between the coil 286 and the signal conditioning circuit assembly described below. A glass frit 359 is disposed in the region between each of the tubes 358 and the walls of the bores 356 through which the tubes 358 extend. The glass frit 359 disposed within the bores 356 is used to seal the bores 356 as well as to electrically isolate the tubes 358. Further, each of the conductors 300 are secured and sealed to the upper portion of the tube 358 through which the conductors 300 extend by solder at the upper portion of the tubes 358. Each of the conductors 353 are secured and sealed to the bores 354 through which they extend by means of glass frit 361 disposed between the walls of each of the bores 354 and the conductors 353.

The conductors 300, which electrically communicate with the annular coil 286, as well as the conductors 353, which electrically communicate with the pressure sensor 308, are electrically connected to a flex circuit 357 which is connected to a signal conditioning circuit assembly 363. The signal conditioning circuit assembly 363 is used to condition the signals received from the pressure sensor 308 which in turn are delivered to the electronic control module 34 through the flex circuit 357. In addition, the signal conditioning circuit assembly 36 also permits direct electrical communication between the flex circuit 357 and the conductors 300 (i.e., without signal conditioning) which in turn electrically communicates with the coil 286. The signal conditioning circuit assembly 363 may include electronic components which are able to temperature compensate, buffer and amplify the output from the pressure sensor 308.

The signal conditioning circuit assembly 363 will now be described in more detail with reference to FIG. 7. The signal conditioning circuit assembly 363 comprises a circuit mounting platform 366 and a circuit board 368, both of which are disposed in the piston rod 44. The circuit mounting platform 366 has a first portion 370, which is circular in cross-section, and a second portion 372 which is semi-circular in cross-section. The first portion 370 is disposed proximate to the header 310, while the second portion 372 axially extends from the first portion 370 in a direction toward the rod guide/valve assembly 86. The first portion 370 of the circuit mounting platform 366 has an increased diameter section 374 and a decreased diameter section 376. The decreased diameter section 376 is disposed at the end of the first portion 370 of the circuit mounting platform 366 which is closest to the lower portion of the shock absorber 10. The decreased diameter section 376 has a sufficiently small diameter so as to allow the decreased diameter section 376 to be inserted into the upper portion of the header 310.

The increased diameter section of the first portion 370 of the circuit mounting platform 366 is disposed adjacent to the inside diameter of the piston rod 44 between the decreased diameter section 376 and the second portion 372 of the circuit mounting platform 366. The first portion 370 of the circuit mounting platform 366 has a plurality of axially extending passages 378 which allow the conductors 353 to pass from the header 310 to the circuit board 368. In addition, the second portion 372 of the circuit mounting platform 366 has an axially extending passage 380 which allow the conductors 300 to pass therethrough.

The second portion 372 of the circuit mounting platform 366 contains a raised platform portion 382 and a lower conductor access portion 384. The raised platform portion 382 of the second portion 372 of the circuit mounting platform 366 is used to accommodate the circuit board 368 which may be secured by means of a thermally conductive epoxy. The conductor access portion 384 of the second portion 372 of the circuit mounting platform 366 is used to permit electrical communication between upwardly extending projections 386 of the conductors 358 and the circuit board 368.

The circuit board 368 includes a plurality of apertures 388 which are operable to mate with upwardly extending projections 386 of the conductors 353 which are located in the conductor access portion 384 of the first portion 370 of the circuit mounting platform 366. Because the conductors 353 electrically communicate with the pressure sensor 308, the circuit board 368 is able to receive the output of the pressure sensor 308. In addition, the circuit board 368 electrically communicates with the conductors 390 which are connected to the electrical connector assembly 76 via the flex circuit 357. Accordingly, the output from the circuit board 368 may be delivered to the electronic control module 34. The signal circuit board 368 contains electronics which are used to condition signals received from the pressure sensor 308. In this regard, the circuit board 368 may comprise a temperature compensating operational amplifier, buffers, and amplifying circuits.

A second embodiment of the signal conditioning circuit assembly 363 will now be described with reference to FIGS. 8A and 8B. In this embodiment, the circuit mounting platform 366 of the signal conditioning circuit assembly 363 comprises a rectangularly shaped projection 392 which extends in a direction toward the rod guide/valve assembly 86 from the first portion 370 of the circuit mounting platform 366. The rectangularly shaped projection 392 is used to accommodate a base plate 394 which will be described below. In addition, the signal conditioning circuit assembly 363 further comprises an end plate member 396. The end plate member 396 includes a first region 398 of circular cross-section which is located at an axial position closest to the rod guide/valve assembly 86. The first region 398 of the end plate member 396 has a cross-sectional diameter which sufficient to engage the internal diameter of the piston rod 44. The end plate member 396 also includes a rectangular projection 400 which is used to accommodate the base plate 394 in the manner described below. The rectangular projection 400 extends from the first region 398 of the end plate member 396 in a direction toward the base valve assembly 88. Finally, the end plate member 396 includes a flex circuit 357 which allows electrical communication between the circuit board 368 and the conductors 300 and the electrical connector assembly 76.

To provide a mounting surface for the circuit board 368, a base plate 394 is provided. The base plate 394 is disposed on the rectangular shaped projection 392 of the circuit mounting platform 366 and the rectangular projection 400 of the end plate member 396, and is preferably formed from aluminum. The base plate 394 has a rectangular surface 402 which is able to accommodate the ceramic circuit board 368 which may be secured thereto by means of a thermally conductive adhesive. In addition, the base plate 394 has a first plurality of projections 404 which extend from the surface 402 of the base plate 394 in a direction away from the rectangular projection 400 of the end plate member 396. The first plurality of projections 404 are used to positionally secure the circuit board 368 on the surface 402 of the base plate 394. Further, the base plate 394 has a second plurality of projections 406. The second plurality of projections 406 extend from the surface 402 of the base plate 394 and engage the rectangularly shaped projection 392 of the circuit mounting platform 366, as well as the rectangular projection 400 of the end plate member 396.

In the third embodiment of the signal conditioning circuit assembly 363 shown in FIGS. 9A and 9B, the signal conditioning circuit assembly 363 further comprises an accelerometer 410, as well as an accelerometer signal conditioning circuit 412 and a pressure sensor signal conditioning circuit 414. The accelerometer 410 is disposed on the portion of the base plate 394 which is located closest to the rod guide/valve assembly 86, and may be attached by suitable means such as a thermally conductive epoxy. The pressure sensor signal conditioning circuit 414 is disposed on the base plate 394 at a position closest to the header 310. The accelerometer signal conditioning circuit 412 is disposed on the surface of the accelerometer 410 opposite the base plate 394. The accelerometer signal conditioning circuit 412 is used for conditioning the signals which are generated by the accelerometer 410.

The accelerometer signal conditioning circuit 412 comprises a first plurality of electrical contacts 416 and a second plurality of electrical contacts 418. The first plurality of electrical contacts 416 of the accelerometer signal conditioning circuit 412 allow electrical communication between the accelerometer 410 and the accelerometer signal conditioning circuit 412, while the second plurality of electrical contacts 418 allow the accelerometer signal conditioning circuit 412 to electrically communicate with the flex circuit 408 of the end plate member 396. In addition, the pressure sensor signal conditioning circuit 414 comprises a first plurality of electrical contacts 420 and a second plurality of electrical contacts 422. The first plurality of electrical contacts 420 of the pressure sensor signal conditioning circuit 414 electrically communicate with the conductors 353, while the second plurality of electrical contacts 422 electrically communicate with the flex circuit 408.

The circuit mounting platform 363 is similar to that which is shown and described with reference to FIGS. 8A and 8B. However, the circuit mounting platform 363 further has a raised portion 424 having a first plurality of conductors 426 disposed therein. The first plurality conductors 426 may be wired patterns which are disposed within the raised portion 424 which allow electrical communication between the pressure sensor signal conditioning circuit 414 and the flex circuit 357, as well as the accelerometer signal conditioning circuit 412 and the flex circuit 357. Finally, the circuit mounting platform 366 has a second plurality of conductors 428 which allow electrical communication between the conductors 300 and the flex circuit 357. The raised portion 424 of the circuit mounting platform 366 is able to pass through an aperture 430 in the base plate 394 so as to allow electrical communication between the conductors 426 and the second plurality of contacts 418 of the accelerometer signal conditioning circuit 412 as well as the second plurality of contacts 422 of the pressure sensor signal conditioning circuit 414.

The components of the circuit board 368 will now be described with reference to FIG. 10. One input from the pressure sensor 308 is delivered to the non-inverting input of an operational amplifier OP1. The non-inverting input of the operational amplifier OP1 is also connected to ground through a capacitor C1 which is used to eliminate noise. The inverting input of the operational amplifier OP1 is also connected to the resistors R1 and R2 which form a voltage divider. The resistor R2 is connected to the supply voltage +Ub, while the resistor R1 is connected to ground. The inverting input of the operational amplifier OP1 is connected to its output through the feedback resistor R3, which is used to control the gain of the operational amplifier OP1. In addition, the output of the operational amplifier OP1 is also connected to the inverting input of the operational amplifier OP2 described below.

The non-inverting input of the operational amplifier OP2 is connected to a second input from the pressure sensor 308, as well as to ground through the capacitor C2 which is used to eliminate noise. The output of the operational amplifier OP2 is connected to its inverting input through the feedback resistor R5, which is used to control the gain of the operational amplifier OP2. In addition, the output of the operational amplifier OP2 is connected to the inverting input of the operational amplifier OP3 to the resistor R6. The resistor R6 has a positive temperature coefficient so as to increase resistance with increase in temperature.

The inverting input of the operational amplifier OP3 also receives the voltage summing input from a resistor network comprising the resistors R15-R19. The resistors R15-R18 are used to provide a stable voltage to the inverting input of the operational amplifier OP3 which is relatively independent of temperature. The resistors R15 and R16 are used to provide static offset compensation, while the resistor R19 is used to provide dynamic offset compensation. Further, the resistor R17 has a positive temperature coefficient so as to increase resistance with increase in temperature. The resistors R15-R19 may be laser trimmed so as to provide the desired voltage to the inverting input of the operational amplifier OP3. The non-inverting input of the operational amplifier OP3 is connected to a voltage divider which comprises the resistors R13 and R14. The resistor R13 is connected to the supply voltage, while the resistor R14 is connected to ground. In addition, the non-inverting input of the operational amplifier OP3 is also connected to the non-inverting input of the operational amplifier OP4 described below. Finally, the inverting input of the operational amplifier OP3 is connected to its output by means of the resistors R7 and R8. The resistor R8 has a positive temperature coefficient so as to increase resistance with temperature.

The output of the operational amplifier OP3 is connected to the inverting input of the operational amplifier OP4 through the resistor R9. In addition, the inverting input of the operational amplifier OP4 is connected to its output by means of the capacitor C3 which is used to integrate and smooth the output from the operational amplifier OP4. The output of the operational amplifier OP4 is also delivered to the resistors R11 and R12, the node between which is connected to the negative supply potential −Ub through the capacitor C4. The resistors R11 and R12, as well as the capacitor C4 are used for providing a stabilized output for capacitive loads. Further, the inverting input of the operational amplifier OP4 is connected to the resistor R12 through the resistor R10.

Finally, the supply voltage +Ub is connected to ground through the filtering capacitor C5. While the operational amplifiers OP1-OP4 may electrically form an LMC 660 quad op amp manufactured by National Semiconductor, other suitable operational amplifiers may be used.

It should be understood that this invention is described in connection with several particular examples thereof. Other modifications will become apparent to those skilled in the art after a study of the specification, drawings and the following claims.

What is claimed is:

1. A shock absorber for damping the movement of the body of an automotive vehicle, said shock absorber comprising:
   a pressure cylinder;
   a piston disposed within said pressure cylinder operable to divide said pressure cylinder into first and second portions;

a piston rod operable to support said piston in said pressure cylinder, said piston rod having first and second portions;

a signal conditioning circuit assembly disposed within said first portion of said piston rod, said signal conditioning circuit assembly comprising:
- (a) a first sensor means for generating a first output in response to the difference in pressure between the damping fluid in said first and second portions of said pressure cylinder, said first sensor means being disposed in a first portion of said piston rod;
- (b) a header disposed within said first portion of said piston rod and being operable to support said first sensor means;
- (c) a first signal conditioning circuit electrically communicating with said first sensor means, said first signal conditioning circuit operable to generate a second output in response to the first output of said first sensor means;
- (d) a circuit mounting platform operable to support said first signal conditioning circuit, said header being operable to positionally secure said circuit mounting platform within said first portion of said piston rod;

means for generating an electrical control signal in response to said second output of said first signal conditioning circuit; and electrical controllable flow means for regulating the flow of damping fluid between said first and second portions of said pressure cylinder, said electrical controllable flow means being disposed adjacent to at least part of second portion of said piston rod.

2. The shock absorber of claim 1, wherein said first sensor means comprises a pressure sensor having first and second surfaces, said first surface of said pressure sensor being in fluid communication with the damping fluid stored in said first portion of said pressure chamber, said second surface of said pressure sensor being in fluid communication with the damping fluid stored in said second portion of said pressure cylinder.

3. The shock absorber of claim 2, wherein said header comprises a radially extending groove, said shock absorber further comprises a piston post operable to engage said piston rod and said radially extending groove of said header to thereby secure said header to said piston rod.

4. The apparatus of claim 3, wherein said header further comprises a pressure passage operable to allow fluid communication between said pressure sensor and said first portion of said pressure cylinder.

5. The shock absorber of claim 4, wherein said header includes at least one axially extending bore, said shock absorber further comprising a conductor extending through said bore in said header operable to allow said pressure sensor to electrically communicate with said first signal conditioning circuit.

6. The shock absorber of claim 5, wherein said shock absorber further comprises means for determining the velocity of said body.

7. The shock absorber of claim 6, wherein said means for determining the velocity of said body comprises an accelerometer, said accelerometer being disposed within said first portion of said piston rod.

8. The shock absorber of claim 7, wherein said accelerometer mechanically communicates with said signal conditioning circuit assembly.

9. The shock absorber of claim 8, wherein said signal conditioning circuit assembly further comprises a second signal conditioning circuit, said second signal conditioning circuit being disposed in said first portion of said piston rod and electrically communicating with said accelerometer.

10. A signal conditioning circuit assembly for use with a shock absorber which is disposed between the body and a wheel of an automotive vehicle, said shock absorber having a piston dividing a pressure cylinder into first and second portions operable to store damping fluid, said signal conditioning circuit assembly comprising:

a header;

a circuit mounting platform mechanically communicating with said header;

an end plate member axially displaced from said circuit mounting platform;

means for sensing the differential pressure between the damping fluid stored in said first and second portions of said working chamber, said means for sensing differential pressure operable to generate an output in response to the differential pressure between the damping fluid stored in said first and second portions of said working chamber, said means for sensing the differential pressure being mechanically secured to said header;

means for sensing the velocity of said body with respect to said pressure cylinder, said means for sensing the velocity of said body operable to generate an output in response to the velocity of said body, said means for sensing the velocity of said body being disposed proximate to said end plate member;

first means for conditioning the output of said means for sensing the differential pressure between the damping fluid stored in said first and second portions of said working chamber, said first means for conditioning disposed proximate to said circuit mounting platform; and second means for conditioning the output of said means for sensing the velocity of said body, said second means for conditioning being disposed proximate to said end plate member.

11. The signal conditioning circuit assembly of claim 10, wherein said means for sensing the differential pressure between the damping fluid stored in said first and second portions of said pressure cylinder comprises a pressure sensor.

12. The signal conditioning circuit assembly of claim 11, wherein said means for sensing the velocity of said wheel with respect to said pressure cylinder comprises an accelerometer.

13. The signal conditioning circuit assembly of claim 12, wherein said shock absorber further comprises a piston rod and wherein said pressure sensor, said accelerometer, said means for conditioning the output of said means for sensing the differential pressure, and said means for conditioning the output of said means for sensing the velocity of said body are disposed within said piston rod.

14. The signal conditioning circuit assembly of claim 13, wherein said header comprises a pressure passage operable to allow fluid communication between said first portion of said working chamber and said pressure sensor.

15. A method for varying the damping characteristics of a shock absorber disposed between the body and a wheel of an automotive vehicle, said shock absorber comprising a pressure cylinder, a piston disposed within said pressure cylinder operable to divide said pressure cylinder into first and second portions, and a piston rod for securing said piston within said pressure cylinder, said method comprising the steps of:

delivering damping fluid from the second portion of said pressure cylinder through an electrical controllable flow means to a first surface of a pressure sensor, said pressure sensor being disposed within said piston rod at a position displaced from said electrical controllable flow means;

delivering damping fluid from the first portion of said pressure cylinder to a second surface of said pressure sensor through a header;

generating a first output from said pressure sensor in response to the pressure of damping fluid acting on said first and second surfaces of said pressure sensor;

delivering said first output of said pressure sensor to a signal conditioning circuit assembly, said signal conditioning circuit assembly being disposed in said piston rod at a position displaced from said electrical controllable flow means, said signal conditioning circuit assembly including:

(a) a first signal conditioning circuit electrically communicating with said pressure sensor, said first signal conditioning circuit operable to generate a second output in response to the first output of said pressure sensor, and (b) a circuit mounting platform operable to support said first signal conditioning circuit, said circuit mounting platform mechanically communicating with said header; and changing the damping characteristics of said shock absorber in response to said second output of said first signal conditioning circuit.

16. The method of claim 15, wherein said step of delivering damping fluid from the first portion of said pressure cylinder to a second surface of said pressure sensor comprises the step of allowing damping fluid to fluidly communicate with a pressure passage disposed in said header which positionally secures said pressure sensor in said piston rod.

17. The method of claim 16, comprising the additional steps of:

generating an output from an accelerometer in response to the movement of said body;

delivering the output of said accelerometer to a second signal conditioning circuit; and changing the damping characteristics of said shock absorber in response to the output of said second signal conditioning circuit.

18. A signal conditioning circuit assembly which is able to be disposed within the piston rod of a shock absorber, said shock absorber having a piston dividing a pressure cylinder into first and second portions operable to store damping fluid, said signal conditioning circuit assembly comprising:

a header having a plurality of axially extending bores disposed therein;

a pressure sensor supported within said piston rod by said header, said pressure sensor operable to generate a first output in response to the differential pressure between the damping fluid in the first and second portions of said pressure cylinder;

a circuit mounting platform disposed within said piston rod, said circuit mounting platform having a first portion with a substantially circular cross-section which mechanically communicates with said piston rod and said header, said first portion of said circuit mounting platform having a plurality of axially extending passages disposed therein;

a first signal conditioning circuit operable to generate a second output in response to said first output from said pressure sensor, said first signal conditioning circuit being supported within said piston rod by said circuit mounting platform; and a first plurality of conductors electrically connecting said pressure sensor to said first signal conditioning circuit, said first plurality of conductors partially disposed within said bores of said header and said passages of said first portion of said circuit mounting platform, whereby the flow of damping fluid between said first and second portions of said pressure cylinder is responsive to said second output of said first signal conditioning circuit.

19. The signal conditioning circuit assembly of claim 18, wherein said circuit mounting platform comprises a second portion having a semi-circular cross-section, said second portion of said circuit mounting platform further having a raised platform portion and a lower conductor access portion.

20. The signal conditioning circuit assembly of claim 19, wherein said first signal conditioning circuit is disposed on said raised platform portion.

21. The signal conditioning circuit assembly of claim 20, further comprising a second plurality of conductors disposed within said lower conductor access portion.

22. The signal conditioning circuit assembly of claim 18, wherein said circuit mounting platform comprises a second portion having a rectangularly shaped projection.

23. The signal conditioning circuit assembly of claim 22, further comprising an end plate member having a region with a circular cross-section operable to engage said piston rod, said end plate member further having a rectangular shaped projection axially extending from said region of said end plate member having said circular cross-section.

24. The signal conditioning circuit assembly of claim 23, further comprising a base plate disposed on said rectangularly shaped projection of said circuit mounting platform and said rectangular shaped projection of said end plate member.

25. The signal conditioning circuit assembly of claim 24, wherein said first signal conditioning circuit is disposed on said base plate.

26. The signal conditioning circuit assembly of claim 25, further comprising an accelerometer operable to sense the velocity of said piston with respect to said pressure cylinder and generate a third output in response thereto.

27. The signal conditioning circuit assembly of claim 26, further comprising a second signal conditioning circuit operable to generate a fourth output in response to said third output from said accelerometer.

28. The signal conditioning circuit assembly of claim 27, wherein said accelerometer is disposed between said second signal conditioning circuit and said base plate.

* * * * *

UNITED STATES PATENT AND TRADEMARK OFFICE
CERTIFICATE OF CORRECTION

PATENT NO. : 4,943,083

DATED : July 24, 1990

INVENTOR(S) : Gary W. Groves and David L. Perry

It is certified that error appears in the above-identified patent and that said Letters Patent is hereby corrected as shown below:

Col. 2, Line 47, "is" should be --are--;

Col. 2, Line 59, "is" should be --are--;

Col. 2, Line 66, "is" should be --are--;

Col. 3, Line 1, "is" should be --are--;

Col. 3, Line 27, "damp" should be --dampen--;

Col. 3, Line 41, after "and", insert --an electronic control module 34 are provided. The mode--;

Col. 3, Line 51-52, "Tenneco patent application 1316N-01495" should be --United States Serial No. 322,774 filed March 13, 1989--;

Col. 7, Line 21, "a" should be --an--;

Col. 7, Line 29, "axially" should be --axial--;

UNITED STATES PATENT AND TRADEMARK OFFICE
CERTIFICATE OF CORRECTION

PATENT NO. : 4,943,083

DATED : July 24, 1990

INVENTOR(S) : Gary W. Groves and David L. Perry

It is certified that error appears in the above-identified patent and that said Letters Patent is hereby corrected as shown below:

Col. 10, Line 25, "a" should be --an--;

Col. 10, Line 62, "bias" should be --biases--;

Col. 15, Line 8, "36" should be --363--;

Col. 16, Line 26, after "which", insert --is--.

Signed and Sealed this

Twenty-seventh Day of October, 1992

Attest:

DOUGLAS B. COMER

Attesting Officer

Acting Commissioner of Patents and Trademarks